United States Patent Office 3,448,081
Patented June 3, 1969

3,448,081
PROCESS FOR PREPARING THERMOSTABILIZED TRIOXANE-CYCLIC ETHER COPOLYMERS
Karl-Heinz Hafner, Bad Orb, and Edgar Fischer, Frankfurt am Main, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 464,198, June 15, 1965. This application Sept. 29, 1967, Ser. No. 671,608
Claims priority, application Germany, June 26, 1964, F 43,265
Int. Cl. C08f 45/58, 45/60
U.S. Cl. 260—67                    8 Claims

ABSTRACT OF THE DISCLOSURE

There is disclosed herein a process for stabilizing a copolymer of trioxane and a cyclic ether by treating the copolymer in an aqueous buffered solution having a pH within the range of about 10.0 to about 10.5 at a temperature within the range of about 100° to about 160° C., the buffered solution containing, per 100 parts by weight of water, about 0.05 to about 1 part by weight of an aliphatic or a hydroxy-aliphatic amine, about 0.25 to about 2 parts by weight of urea or melamine and about 0.1 to about 1 part by weight of a weak organic acid or a weak inorganic acid.

---

This application is a continuation-in-part of application Ser. No. 464,198 filed June 15, 1965, now abandoned.

This invention relates to a process for preparing thermostabilized copolymers.

It is known that copolymers containing oxymethylene groups can be depolymerized at a high temperature in a non-aqueous solution or in an aqueous suspension under the action of a catalyst, for example, an alkali metal hydroxide or an alkaline earth metal hydroxide, and in the presence of a formaldehyde-intercepting compound, for example, a urea or diethanol amine, the depolymerization beginning at the end of a chain and stopping after reaching a mixing component.

Now we have found a process for stabilizing copolymers of trioxane and at least one cyclic ether of the general formula

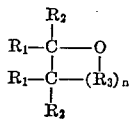

in which $R_1$ and $R_2$ each represent hydrogen atoms or lower alkyl groups which can be substituted by halogen atoms, $R_3$ represents a methylene group, an oxymethylene group, a lower alkyl- or a halogen-lower alkyl-substituted methylene group, or a lower alkyl- or halogen-lower alkyl-substituted oxymethylene group, said lower alkyl groups having one or two carbon atoms, and $n$ is an integer of 0 to 3, by treatment with an aqueous solution at a pH of about 10.0 to about 10.5 at a temperature within the range of about 100° to about 160° C., wherein the solution used contains a buffer system comprising about 0.05 to about 1 part by weight of an amine, about 0.25 to about 2 parts by weight of urea or melamine, and about 0.1 to about 1 part by weight of a weak organic or inorganic acid per 100 parts of water in the solution. The weak organic or inorganic acid preferably has a first dissociation constant ($k_1$) less than $2 \times 10^{-4}$ if the acid is monobasic, less than $4 \times 10^{-2}$ if the acid is dibasic and less than $2 \times 10^{-4}$ if the acid is tribasic.

Suitable copolymers are, for example, polymers of trioxane and about 0.05 to about 10 parts by weight per 100 parts of trioxane of one or more cyclic ethers such as ethylene oxide, propylene oxide, epichlorhydrin, 1,4-butanediol formal, diethylene glycol formal, 1,4-butene-diol formal or 1,4-butane diol diglycidyl ether.

Amines that can be used are those corresponding to the following formula

in which $R_4$ represents a hydrogen atom, an alkyl group containing 1 to 5 carbon atoms or a hydroxyalkyl group containing 1 to 5 carbon atoms, $R_5$ represent an alkyl group containing 1 to 5 carbon atoms or a hydroxyalkyl group containing 1 to 5 carbon atoms and $R_6$ represents an alkyl group containing 1 to 5 carbon atoms or a hydroxyalkyl group containing 1 to 5 carbon atoms. Suitable amines are, for example, dimethyl amine, triethyl amine, tri-n-butyl amine or triethanol amine.

Suitable acids are weak organic or weak inorganic acids, especially those having a first dissociation constant less than $2 \times 10^{-4}$ if the acid is monobasic, less than $4 \times 10^{-2}$ if the acid is dibasic and less than $2 \times 10^{-4}$ if the acid is tribasic. There can be used, for example, formic acid ($k_1 = 1.77 \times 10^{-4}$), acetic acid ($k_1 = 1.76 \times 10^{-5}$), oxalic acid ($k_1 = 3.8 \times 10^{-2}$), barbituric acid $$(k_1 = 9.8 \times 10^{-5})$$

phthalic acid ($k_1 = 1.2 \times 10^{-3}$), carbonic acid $$(k_1 = 4.01 \times 10^{-7})$$

and boric acid ($k_1 = 7.3 \times 10^{-10}$). The $k_1$ values are based on measurements of the dissociation constant at 25° C. The acid is used in an amount such that pH of the buffered solution is within range of about 10.0 to about 10.5.

Suitable buffer solutions are, for example, those having the following compositions:

triethyl amine/urea/formic acid having a pH of 10.3;
triethyl amine/urea/acetic acid having a pH of 10.3;
triethyl amine/urea/oxalic acid having a pH of 10.5;
triethyl amine/urea/barbituric acid having a pH of 10.2;
triethyl amine/urea/boric acid having a pH of 10.1;
triethyl amine/urea/carbonic acid having a pH of 10.0;
triethyl amine/urea/phthalic acid having a pH of 10.1;
triethyl amine/melamine/boric acid having a pH of 10.1.

The reaction is advantageously carried out by suspending about 10 to about 100 parts by weight of the copolymer to be stabilized in about 100 parts by weight of an aqueous buffer solution of the kind described above and heating the resulting suspension for 15 to 120 minutes under superatmospheric or autogenous pressure in an autoclave provided with stirring means to a temperature within the range of about 130° to about 150° C. When the reaction is terminated the cooled polymer is suction filtered, washed with water until neutral and dried in an oven under reduced pressure at a temperature within the range of about 50° to about 80° C. The stabilized products have excellent thermostability and do not undergo change of color.

If, instead of a buffer solution according to this invention, an aqueous solution of an amine and a urea is used, the polymers obtained are thermostable but their color will have changed.

The following examples serve to illustrate the invention but are not intended to limit it thereto, the parts being by weight.

EXAMPLE 1

120 grams of a copolymer of 98 parts of trioxane and 2 parts of ethylene oxide were suspended in a solution of 591 grams of waters, 3 grams of triethyl amine and 6 grams of urea which had been adjusted to a pH of 10.3 by the addition of formic acid. The resulting suspension was heated for 30 minutes to a temperature of 145°–147° C. in a glass autoclave having a capacity of 1 liter and provided with stirring means and oil circulation heating. The cooled, degraded copolymer was suction filtered, washed with water until neutral and dried under reduced pressure at a temperature within the range of 50° to 70° C. The yield amounted to 114 grams. A sample of the material obtained was additionally stabilized with 0.7% of 2,2-methylene-bis-4-methyl-6-butylphenol and 0.2% of dicyanodiamide, and was found to lose 0.0312% of its weight when treated for 45 minutes at 230° C.

A shaped structure prepared from the aforesaid copolymer at 190° C. had a white color.

EXAMPLE 2

120 grams of copolymer of 98 parts of trioxane and 2 parts of ethylene oxide were suspended in a solution of 591 grams of water, 3 grams of triethyl amine and 6 grams of urea which had been adjusted to a pH of 10.3 by the addition of acetic acid. The resulting suspension was heated for 30 minutes to a temperature of 145°–147° C. in a glass autoclave having a capacity of 1 liter and provided with stirring means and oil circulation heating. The cooled, degraded copolymer was suction filtered, washed with water until neutral and dried under reduced pressure at a temperature within the range of 50° to 70° C.

Yield _____grams__ 115
Loss of weight _____percent__ 0.0223
Color _____ White

EXAMPLE 3

120 grams of a copolymer of 98 parts of trioxane and 2 parts of ethylene oxide were suspended in a solution of 591 grams of water, 3 grams of triethyl amine and 6 grams of urea which had ben adjusted to a pH of 10.5 by the addition of oxalic acid. The resulting suspension was heated for 30 minutes to a temperature of 145°–174° C. in a glass autoclave having a capacity of 1 liter and provided with stirring means and oil circulation heating.

The cooled, degraded copolymer was suction filtered, washed with water until neutral and dried under reduced pressure at a temperature within the range of 50° to 70° C.

Yield _____grams__ 110
Loss of weight _____percent__ 0.0216
Color _____ White

EXAMPLE 4

120 grams of a copolymer of 98 parts of trioxane and 2 parts of ethylene oxide were suspended in a solution of 594 grams of water, 3 grams of triethyl amine and 3 grams of urea which had been adjusted to a pH of 10.2 by the addition of barbituric acid. The resulting suspension was heated for 30 minutes to a temperature of 145°–147° C. in a glass autoclave having a capacity of 1 liter and provided with stirring means and oil circulating heating. The cooled, degraded copolymer was suction filtered, washed with water until neutral and dried under reduced pressure at a temperature within the range of 50° to 70° C.

Yield _____grams__ 114
Loss of weight _____percent__ 0.0181
Color _____ White

EXAMPLE 5

120 grams of a copolymer of 98 parts of trioxane and 2 parts of ethylene oxide were suspended in a solution of 591 grams of water, 3 grams of triethyl amine and 6 grams of urea which had been adjusted to a pH of 10.1 by the addition of boric acid. The resulting suspension was heated for 30 minutes to a temperature of 145°–147° C. in a glass autoclave having a capacity of 1 liter and provided with stirring means and oil circulation heating. The cooled, degraded copolymer was suction filtered, washed with water until neutral and dried under reduced pressure at a temperature within the range of 50° to 70° C.

Yield _____grams__ 151
Loss of weight _____percent__ 0.0197
Color _____ White

EXAMPLE 6

120 grams of a copolymer of 98 parts of trioxane and 2 parts of ethylene oxide were suspended in a solution of 591 grams of water, 3 grams of triethyl amine and 6 grams of urea which had been adjusted to a pH of 10.0 by the addition of carbon dioxide. The resulting suspension was heated for 30 minutes to a temperature of 145°–147° C. in a glass autoclave having a capacity of 1 liter and provided with stirring means and oil circulation heating. The cooled, degraded copolymer was suction filtered, washed with water until neutral and dried under reduced pressure at a temperature within the range of 50° to 70° C.

Yield _____grams__ 116
Loss of weight _____percent__ 0.0198
Color _____ White

EXAMPLE 7

120 grams of a copolymer of 98 parts of trioxane and 2 parts of ethylene oxide were suspended in a solution of 591 grams of water, 3 grams of triethyl amine and 6 grams of melamine which had been adjusted to a pH of 10.1 by the addition of boric acid. The resulting suspension was heated for 30 minutes to a temperature of 145°–147° C. in a glass autoclave having a capacity of 1 liter and provided with stirring means and oil circulating heating. The cooled, degraded copolymer was suction filtered, washed with water until neutral and dried under reduced pressure at a temperature within the range of 50° to 70° C.

Yield _____grams__ 113
Loss of weight _____percent__ 0.0198
Color _____ White

EXAMPLE 8

120 grams of a copolymer of 98 parts of trioxane and 2 parts of ethylene oxide were suspended in a solution of 597 grams of water and 3 grams of triethyl amine and heated for 30 minutes to a temperature of 145°–147° C. in a glass autoclave having a capacity of 1 liter and provided with stirring means and oil circulation heating. The cooled, degraded copolymer was suction filtered, washed with water until neutral and dried under reduced pressure at a temperature within the range of 50° to 70° C.

Yield _____grams__ 110
Loss of weight _____percent__ 0.0267
Color _____ Brown

EXAMPLE 9

120 grams of a copolymer of 98 parts of trioxane and 2 parts of ethylene oxide were suspended in a solution of 591 grams of water, 3 grams of triethyl amine and 6 grams of urea and heated for 30 minutes to a temperature of 145°–147° C. in a glass autoclave having a capacity of 1 liter and provided with stirring means and oil circulation heating. The cooled, degraded copolymer was suction filtered, washed with water until neutral and dried under reduced pressure at a temperature within the range of 50° to 70° C.

Yield _____grams__ 113
Loss of weight _____percent__ 0.0257
Color _____ Yellow

EXAMPLE 10

120 grams of a copolymer of 98 parts of trioxane and 2 parts of ethylene oxide were suspended in a solution of 597 grams of water and 3 grams of triethyl amine which had been adjusted to a pH of 8.1 by the addition of $CO_2$. The resulting suspension was heated for 30 minutes to a temperature of 145°–147° C. in a glass autoclave having a capacity of 1 liter and provided with stirring means and oil circulation heating. The cooled, degraded copolymer was suction filtered, washed with water until neutral and dried under reduced pressure at a temperature within the range of 50° to 70° C.

Yield _____grams__ 111
Loss of weight _____percent__ 0.0382
Color _____ Yellow

We claim:
1. A process for stabilizing a copolymer of trioxane which comprises treating a copolymer of trioxane and a cyclic ether of the formula

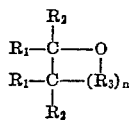

in which $R_1$ and $R_2$ each represent a hydrogen atom, an alkyl group or a halogen-substituted alkyl group, $R_3$ represents a methylene group, an oxymethylene group, an alkyl-substituted methylene group, a halogen-alkyl-substituted methylene group, an alkyl-substituted oxymethylene group or a halogen-alkyl-substituted oxymethylene group, each of said alkyl groups having one or two carbon atoms, and $n$ is an integer of 0 to 3, in an aqueous buffered solution having a pH within the range of about 10.0 to about 10.5 at a temperature within the range of about 100° to about 160° C., said buffered solution containing, per 100 parts by weight of water, about 0.05 to about 1 part by weight of an aliphatic or hydroxy-aliphatic amine having alkyl groups of 1 to 5 carbon atoms, about 0.25 to about 2 parts by weight of urea or melamine and about 0.1 to about 1 part by weight of a weak organic acid or a weak inorganic acid, the amount of said weak organic acid or said weak inorganic acid being such as to adjust the pH of said buffered solution to within said range of about 10.0 to about 10.5.

2. A process for stabilizing a trioxane copolymer according to claim 1 wherein said cyclic ether is ethylene oxide, propylene oxide, epichlorhydrin, 1,4-butane-diol formal, diethylene glycol formal, 1,4-butene-diol formal or 1,4-butane-diol diglycidyl ether.

3. A process for stabilizing a trioxane copolymer according to claim 1 wherein said cyclic ether is ethylene oxide.

4. A process for stabilizing a trioxane copolymer according to claim 1 wherein said copolymer contains about 0.05 to about 10 parts by weight of said cyclic ether per 100 parts of trioxane.

5. A process for stabilizing a trioxane copolymer according to claim 1 wherein said amine is dimethylamine, triethylamine, tri-n-butylamine or triethanolamine.

6. A process for stabilizing a trioxane copolymer according to claim 1 wherein said weak organic acid or said weak inorganic acid has a first dissociation constant of less than about $2 \times 10^{-4}$ if it is monobasic, less than about $4 \times 10^{-2}$ if it is dibasic or less than about $2 \times 10^{-4}$ if it is tribasic.

7. A process for stabilizing a trioxane copolymer according to claim 1 wherein said weak organic acid or said weak inorganic acid is formic acid, acetic acid, oxalic acid, barbituric acid, phthalic acid, boric acid or carbonic acid.

8. A process for stabilizing a trioxane copolymer according to claim 1 wherein about 10 to about 100 parts by weight of said copolymer is treated per 100 parts of said buffered solution.

References Cited
UNITED STATES PATENTS

| | | | |
|---|---|---|---|
| 3,174,948 | 3/1965 | Wall et al. | 260—67 |
| 3,198,852 | 8/1965 | Tanner | 260—45.85 XR |
| 3,225,005 | 12/1965 | Asmus et al. | 260—67 |

WILLIAM H. SHORT, *Primary Examiner.*

L. M. PHYNES, *Assistant Examiner.*

U.S. Cl. X.R.

260—45.9, 45.85